United States Patent Office 3,458,291
Patented July 29, 1969

3,458,291
SEPARATION OF RUTHENIUM AND PLUTONIUM BY A LITHIUM FLUORIDE SORPTION TECHNIQUE
James G. Riha, North Riverside, La Verne E. Trevorrow, Glen Ellyn, and Martin J. Steindler, Park Forest, Ill., assignors to the United States of America as represented by the United States Atomic Energy Commission
No Drawing. Filed June 21, 1968, Ser. No. 738,837
Int. Cl. C01g 55/00, 56/00
U.S. Cl. 23—337                                      5 Claims

ABSTRACT OF THE DISCLOSURE

Ruthenium fluoride is separated from plutonium hexafluoride by flowing a mixture of the fluorides and fluorine gas through a bed of lithium fluoride particles maintained at about 400° C. The ruthenium fluoride forms a stable complex with the lithium fluoride while the plutonium desorbs in the form of plutonium hexafluoride.

CONTRACTUAL ORIGIN OF THE INVENTION

The invention described herein was made in the course of, or under, a contract with the United States Atomic Energy Commission.

BACKGROUND OF THE INVENTION

This invention relates to a process for separating ruthenium from plutonium and more particularly to a process in which ruthenium fluoride and plutonium hexafluoride are sorbed onto lithium fluoride and form complexes therewith.

A fluoride volatility process is being developed to separate uranium from plutonium in spent reactor fuels. At some point in the process a plutonium hexafluoride stream and a uranium hexafluoride stream are formed each of which contains various fission product fluorides. The most difficult fission product to remove from the hexafluorides of either uranium or plutonium is ruthenium. One method which has been used to remove ruthenium fluoride from uranium hexafluoride is to contact a mixture of uranium hexafluoride and ruthenium fluoride with solid sodium fluoride. If proper conditions are maintained, the uranium hexafluoride preferentially sorbs onto the sodium fluoride and forms a complex therewith while the ruthenium fluoride either does not sorb or desorbs from the sodium fluoride solid. Thereafter the uranium is separated from the sodium fluoride to effect the uranium-ruthenium separation. A separation based on selective sorption with sodium fluoride for mixtures of plutonium and ruthenium fluorides is more difficult because plutonium hexafluoride forms a stable complex with sodium fluoride which is not easily separated.

It is known that plutonium hexafluoride and lithium fluoride form a solid lithium fluoride-plutonium tetrafluoride complex which disassociates under the action of fluorine gas at about 400° C. to reform plutonium hexafluoride. From available thermodynamic data it has been presumed that ruthenium fluoride would form a somewhat less stable complex with lithium fluoride than plutonium hexafluoride. Since the ruthenium fluoride-lithium fluoride complex was considered to be only somewhat less stable than the plutonium fluoride-lithium fluoride complex, a separation of ruthenium and plutonium by sorbing plutonium hexafluoride and ruthenium fluoride onto lithium fluoride and preferentially removing one was considered impossible because there was no apparent way to remove either the plutonium or ruthenium from the lithium fluoride without concurrently removing the other. It was unexpected therefore to discover that a mixture of plutonium hexafluoride and ruthenium fluoride formed a complex with lithium fluoride which upon the action of fluorine gas at 400° C. released plutonium hexafluoride but not the ruthenium fluoride.

SUMMARY OF THE INVENTION

This invention comprises the process of contacting a mixture of gases containing ruthenium fluoride and plutonium hexafluoride with lithium fluoride particles to form solid complexes therewith and thereafter or concurrently contacting the complexes with fluorine gas to preferentially remove the plutonium in the form of the hexafluoride.

DESCRIPTION OF THE PREFERRED EMBODIMENT

Several experiments have been conducted in which fluorine gas was passed over a solid mixture of $Ru^{106}$ tracer-ruthenium metal carrier and plutonium tetrafluoride spread in a boat in a tube reactor. The reaction temperature was about 350 to 450° C., and the reaction product was a gaseous mixture of excess fluorine, plutonium hexafluoride and ruthenium fluoride. It is assumed that the ruthenium fluoride is ruthenium pentafluoride but the hexafluoride species may exist and the use of the term ruthenium fluoride is meant to cover both species. The reaction product was passed through a series of two connected traps. Each trap contained a bed of solid particles. The first trap contained granulated lithium fluoride and the second trap contained sodium fluoride pellets. The sodium fluoride trap was used as a backup to the lithium fluoride trap in order to collect any plutonium or ruthenium fluorides which penetrated the lithium fluoride trap. The lithium fluoride used in the trap was prepared by fluorination of lithium carbonate with pure fluorine. The powdered lithium fluoride from the fluorination was partially sintered at 500° C. for about 5 hours to reduce the transport of fine solid particles by the gas streams. Before the experiments, the lithium fluoride trap was evacuated at 25° C. for several hours and flushed with fluorine at 300° C. for ½ hour. At the end of the experiments, the entire lithium fluoride and the entire sodium fluoride traps were removed and counted at the same geometry for $Ru^{106}$ activity with a germanium-lithium detector and a multi-channel analyzer. The results for the experiments are expressed as a decontamination factor (DF) which is defined as follows:

$$DF = \frac{CPM\ Ru^{106}/mg.\ PuF_4\ in\ the\ charge}{CPM\ Ru^{106}/mg.\ PuF_4\ recovered\ in\ the\ NaF\ trap}$$

where CPM is counts per minute.

Experiment I

In the first run, 92 mg. of plutonium tetrafluoride and 103.2 c.p.m. of $Ru^{106}$ were fluorinated with fluorine gas for 5 hours at 400° C., 4 hours at 450° C. and 1 hour at 550° C. The gas stream from the fluorination step was passed through the lithium fluoride trap, which was held at 400° C. for 1 hour and at 300° C. for 9 hours. The effluent from the lithium fluoride trap was then passed through the sodium fluoride trap, which was held at 100° C. for the entire 10 hours. 8 mg. plutonium tetrafluoride and less than 1 c.p.m. $Ru^{106}$ remained in the fluorination reactor. 0.5 mg. plutonium tetrafluoride and 53.6 c.p.m. $Ru^{106}$ remained in the lithium fluoride trap and 53 mg. plutonium tetrafluoride and 0.23 c.p.m. $Ru^{106}$ were trapped by the sodium fluoride. The DF for this run was $2.6 \times 10^2$. It may be seen from a calculation of the amounts of the materials in the reactor and the traps that more than half of the ruthenium fluoride was unrecovered. In this, as well as in all the later runs, discrepancies in the amount of ruthenium in the initial charge and the amount of ruthenium recovered from all the component parts exist. It is believed that there is a significant holdup of ruthenium in the lines and valves used in the apparatus.

Experiment II 185 mg. plutonium tetrafluoride and 91.7 c.p.m. $Ru^{106}$ were fluorinated for 1 hour at 350° C., 3 hours at 450° C. and 3 hours at 400° C. The lithium fluoride trap was maintained at 300° C. for 7 hours and in this experiment two sodium fluoride traps were used. The first trap was maintained at 100° C. for the first 4 hours, at which time the effluent from the lithium fluoride trap was switched to the second sodium fluoride trap, which was also maintained at 100° C. for the last 3 hours of the experiment. 10 mg. plutonium tetrafluoride and less than 1 c.p.m. $Ru^{106}$ were found in the fluorination reactor. 45.8 mg. plutonium tetrafluoride and 51 c.p.m. $Ru^{106}$ were trapped by the lithium fluoride. 97.5 mg. plutonium tetrafluoride and 0.04 c.p.m. $Ru^{106}$ were trapped by the first sodium fluoride trap, and 33 mg. plutonium tetrafluoride and 0.03 c.p.m. $Ru^{106}$ was $9 \times 10^2$. In this experiment, as in all later experiments, the amount of plutonium recovered was almost equal to the amount of plutonium charged. The discrepancy which existed in the first experiment was not repeated in later experiments.

Experiment III

Experiment III was essentially the same as Experiments II and produced a DF of $1.1 \times 10^3$.

Experiment IV 188 mg. plutonium tetrafluoride and 91.7 c.p.m. $Ru^{106}$ were fluorinated at 350° C. for 1 hour and at 450° C. for 6 hours. The lithium fluoride trap was maintained at 200° C. for 7 hours and two sodium fluoride traps were used, both of which were maintained at 100° C. 3 mg. plutonium tetrafluoride and 0.34 c.p.m. $Ru^{106}$ were retained in the fluorination reactor. 22.8 mg. plutonium tetrafluoride and 41.5 c.p.m. $Ru^{106}$ were retained in the lithium fluoride trap. 156.8 mg. plutonium tetrafluoride and 0.32 c.p.m. $Ru^{106}$ were retained in the combined sodium fluoride traps. The calculated DF was $2.4 \times 10^2$ and shows that a lithium fluoride trap maintained at 300° C. is more efficient than a trap maintained at 200° C.

For both Experiments III and IV, the percentage of plutonium retained by the lithium fluoride trap was calculated and is defined as $$\frac{\text{mg PuF}_4 \text{ in LiF trap}}{\text{mg PuF}_4 \text{ in LiF trap} + \text{mg PuF}_4 \text{ in NaF trap}}$$

In Experiment III the plutonium retention was 26%, while in Experiment IV the plutonium retention was 13%.

Experiment V

Experiment V was similar to Experiment IV except that fluorine flow was continued for a longer time than in Experiment IV in order to reduce the plutonium retention of the lithium fluoride trap. 157 mg. plutonium tetrafluoride and 91.7 c.p.m. $Ru^{106}$ were fluorinated with fluorine at 350° C. for 1 hour and at 450° C. for 9 hours. The lithium fluoride trap was maintained at 300° C. for 10 hours and a single sodium fluoride trap was maintained at 100° C. for the entire 10 hours. 5 mg. plutonium tetrafluoride and 0.12 c.p.m. $Ru^{106}$ were retained in the fluorination reactor. 6.2 mg. plutonium tetrafluoride and 67.6 c.p.m. $Ru^{106}$ were retained in the lithium fluoride trap and 151 mg. plutonium tetrafluoride and 0.029 c.p.m. $Ru^{106}$ were retained in the sodium fluoride trap. The DF was $3.0 \times 10^3$ and the plutonium retention was 4%.

Experiment VI

In this experiment optical grade lithium fluoride crystals were used instead of partially sintered powder. 211 mg. plutonium tetrafluoride and 447 c.p.m. $Ru^{106}$ were fluorinated for 1 hour at 350° C. and at 450° C. for 6 hours. The lithium fluoride trap was maintained at 300° C. for 7 hours and two sodium fluoride traps were maintained at 100° C. 4 mg. plutonium tetrafluoride and 2 c.p.m. $Ru^{106}$ remained in the fluorination reactor. 2.5 mg. plutonium tetrafluoride and 205 c.p.m. $Ru^{106}$ remained in the lithium fluoride trap while 210 mg. plutonium tetrafluoride and 1.8 c.p.m. $Ru^{106}$ were trapped by the sodium fluoride. The DF was $2.4 \times 10^2$ and the plutonium retention was 1.2%.

Experiment VII

Lithium fluoride pellet fragments −6 to +10 mesh were used instead of optical grade lithium fluoride. 175 mg. plutonium tetrafluoride and 402.3 c.p.m. $Ru^{106}$ were fluorinated for 1 hour at 350° C. and at 450° C. for 8 hours. The lithium fluoride trap was held at 300° C. for 7 hours and at 400° C. for 2 hours. Three sodium fluoride traps were used and all were maintained at 100° C. 3 mg. plutonium tetrafluoride and 0.5 c.p.m. $Ru^{106}$ remained in the fluorination reactor. 5.6 mg. plutonium tetrafluoride and 130 c.p.m. $Ru^{106}$ remained in the lithium fluoride trap while 162.5 mg. plutonium tetrafluoride and 0.63 c.p.m. $Ru^{106}$ were trapped by the sodium fluoride. The DF was $6.0 \times 10^2$ and the plutonium retention was 3.2%.

Experiment VIII

Experiment VIII was similar to Experiment VII except that the fluorination time was 7 hours, 1 hour at 350° C. and 6 hours at 450° C. and the lithium fluoride trap of pellet fragments was continuously maintained at 400° C. The DF was $9.0 \times 10^2$ and the plutonium retention was 2%.

Experiment IX

Experiment IX was similar to Experiment VIII except that the fluorination time was 5½ hours, 1 hour at 350° C. and 4½ hours at 450° C. and lithium fluoride trap was maintained at 400° C. for 5½ hours. The DF was $1.1 \times 10^3$ and the plutonium retention was 1.6%.

Experiment X

Experiment X was similar to Experiment IX except that the lithium fluoride trap was maintained at 500° C. for 4 hours. The DF was 21 and the plutonium retention was 7.9%.

No attempt is herein made to define the chemical composition of the complexes prepared or to explain the variation between the theoretically predicted behavior and actually observed behavior of the complexes. Reported above is only what was done, how it was done and what resulted therefrom. In summary, these experiments show that lithium fluoride with the greatest surface area is the most efficient for trapping ruthenium. Temperatures between 200 and 500° C. are acceptable for the lithium fluoride trap, but the most efficient temperature is about 400° C. When the lithium fluoride trap is maintained at 500° C., a considerable amount of ruthenium penetrates the trap. It also appears that longer fluorination times of the lithium fluoride trap results in smaller plutonium retention.

It will be understood that the invention is not to be limited to the details given herein but that it may be modified within the scope of the appended claims.

The embodiments of the invention in which an exclusive property or privilege is claimed are defined as follows:

1. A process of separating ruthenium fluoride from plutonium hexafluoride comprising flowing a gaseous mixture of ruthenium fluorides and plutonium hexafluoride through lithium fluoride particles, heating said particles to a temperature between about 200° C. and about 500° C. in the presence of fluorine, whereby the plutonium hexafluoride is volatilized and the ruthenium fluorides are preferentially retained by the lithium fluoride.

2. The process of claim 1 wherein fluorine is flowed through the lithium fluoride particles after the flow of ruthenium fluorides and plutonium hexafluoride has stopped.

3. The process of claim 2 wherein the lithium fluoride is maintained at about 400° C. during the fluorine flow.

4. The process of claim 2 wherein the lithium fluoride is in the form of a powder.

5. The phocess of claim 2 wherein the lithium fluoride is in the form of particles which pass through a 10 mesh screen.

References Cited

UNITED STATES PATENTS

| | | | |
|---|---|---|---|
| 3,208,819 | 9/1965 | Wallace | 23—326 |
| 3,136,715 | 6/1964 | Ames et al. | 23—326 |
| 3,101,998 | 8/1963 | Milliken et al. | 23—326 |
| 3,039,847 | 6/1962 | Campbell et al. | 23—326 |

OTHER REFERENCES

Brater, Removal of Impurities From Uranium Hexafluoride by Selective Sorption Techniques, Report K 1666, June 1966.

Stephenson et al., Removal of Impurities From Uranium Hexafluoride Using Selective Sorption Techniques, Report K 1713, July 17, 1967.

CARL D. QUARFORTH, Primary Examiner

MICHAEL J. McGREAL, Assistant Examiner

U.S. Cl. X.R.

23—326, 344

UNITED STATES PATENT OFFICE
CERTIFICATE OF CORRECTION

Patent No. 3,458,291                                        July 29, 1969

James G. Riha et al.

It is certified that error appears in the above identified patent and that said Letters Patent are hereby corrected as shown below:

Column 3, line 22, after "$Ru^{106}$" insert -- were trapped by the second sodium fluoride trap. The DF for $Ru^{106}$ --.

Signed and sealed this 21st day of April 1970.

(SEAL)
Attest:

Edward M. Fletcher, Jr.
Attesting Officer

WILLIAM E. SCHUYLER, JR.
Commissioner of Patents